United States Patent Office 3,801,536
Patented Apr. 2, 1974

3,801,536
HARDENABLE COMPOSITION WITH RESINOUS BINDER CONTAINING SPHEROIDAL MICRONIC INORGANIC PARTICLES
Jean Guenantin, Apt. 305, Residence Gallardon, 37 Chambray-les-Tours, France
Continuation-in-part of application Ser. No. 826,125, May 10, 1969. This application Nov. 29, 1971, Ser. No. 202,807
Claims priority, application France, May 22, 1968, 152,731
Int. Cl. C08g 51/04
U.S. Cl. 260—40 R     15 Claims

ABSTRACT OF THE DISCLOSURE

A hardenable composition consisting of a binder component, and an aggregate component, the binder component consisting essentially of a synthetic-resin matrix in which a micronic inorganic constituent with a particle size substantially less than two microns is distributed in the binder component, is of a constant viscosity by virtue of the presence of about 30% spheroidal grains in the inorganic constituent. The binder is present in an amount of 2 to 13% by weight of the total composition and the inorganic constituent is present in an amount of 25 to 75% by weight of the binder component.

(1) CROSS-REFERENCE TO RELATED APPLICATION

This application is a continuation-in-part of my copending application Ser. No. 826,125, filed May 10, 1969, and entitled, "Binder Composition Particularly for Materials Intended for Building Purposes," (now abandoned).

(2) FIELD OF THE INVENTION

My present invention relates to hardenable compositions containing synthetic-resin binders and an aggregate, especially for building construction. More particularly, the invention relates to an improved resin-containing hardenable binder adapted to be employed with an inorganic aggregate.

(3) BACKGROUND OF THE INVENTION

It has been proposed heretofore to provide hardenable nonhydraulic binders in various phases of building construction, e.g. for the casting of blocks, for the prefabrication or on-site fabrication of slabs and wall structures, for use as mortars and masonry fillers, for the covering of steel or other structural elements, and for the casting of roofs, floors, walls or the like as a substitute for concrete. For example, flooring consisting of synthetic resin binders and large-particle aggregates has been provided to obtain the stone-like esthetic effects of the composition as well as the structural advantages thereof.

Conventional compositions for the above purposes have been found to be disadvantageous for a wide variety of reasons. For example, the resinous binder may be a poor agglomerating agent in the sense that it is incapable of acting as a binder for a high proportion of inorganic particles. At the very least, some 15–20% by weight of the composition may be made up of the resin and in most cases, a minimum of 15% by weight is required if the composition is to have suitable mechanical properties. For reasons which are not fully understood, conventional binder systems have limited adhesion to the large-particle aggregates unless they are present in an amount upwards of 15% by weight of the finished composition. In amounts of less than, say, the 15% minimum mentioned earlier, the compressive and tensile strengths of the hardened composition are low, the resistance to wear is poor and the composition is sensitive to impact.

The high proportions of binder resin required in the finished product also entail disadvantages in the handling and use of the product. For example, a high proportion of the synthetic-resin binder, generally above 15% by weight of the hardenable composition, results in a molding paste which is sticky and viscous and therefore difficult or impossible to use. Moreover, the composition has insufficient bending strength and compressive strength. The modulus of elasticity is also low and it has been found to be impractical to employ the composition for structural elements which may be exposed to temperatures above 20° C. It should also be noted that hardened compositions with a high proportion of binder resin are also characterized by impermeability to gases and moisture, which is a disadvantage in the building field. Not unimportant is the fact that the binder is perhaps the most expensive element of the composition and high proportions of binder resin add materially to the cost.

Efforts to overcome these disadvantages by the use of additives for the binder have generally been considered failures since most additives interfere with the bond between the aggregate and the resin and are incapable of overcoming the other disadvantages enumerated above. As a case in point, it has been found that the addition of fine-grained fillers to the binder, where the fillers have a random grain size and configuration as is normally present in most mineral fillers, shows no improvement over systems without such fillers for many of the physical properties mentioned earlier.

(4) OBJECTS OF THE INVENTION

It is the principal object of my present invention to provide an improved hardenable resin-binder composition in which the aforementioned disadvantages can be obviated and a marked improvement in the physical properties of the hardened product can be obtained at low cost.

Another object of the invention is to provide an improved binder for compositions of the character described.

Yet another object of the invention is to provide a system enabling reduction of the proportion of the binder which may be used in a hardenable resin-matrix composition.

(5) SUMMARY OF THE INVENTION

These objects and others which will become apparent hereinafter, are attained in accordance with the present invention which provides a hardenable composition consisting essentially of a binder component and an aggregate component in substantially mutual homogeneous admixture, the aggregate component consisting of relatively large-grain particles of an inorganic substance while the binder component consists of a substantially homogeneous blend of a hardenable synthetic-resin and a fine-grain micronic inorganic filler, the particle-size of which is below 2 microns and which make up 25 to 75% by weight of the binder component. The invention is based, in large measure, upon my surprising discovery that there is a critical relationship between the viscosity properties of a binder component and the ability to reduce the proportion of resin in the eventual composition and the maximum compressive and bending strength and modulus of elasticity which can be obtained. This relationship is all the more surprising since it manifests itself in a marked improvement of the hardened composition in spite of the fact that the viscosity of the binder component is not ordinarily of concern once the binder is hardened and none of the improved physical properties can be foreseen from the characteristics of flowable binder. More precisely, my invention resides in the discovery that it is possible to create a binder with a so-called equiviscous character, i.e. a viscosity which is substantially independent of mechanical disturbance and, therefore, is almost free from thixothropic character and thereby obtain a major improvement in the physical properties of a hardened product containing this binder component. Even more surprising is the fact that this equiviscous binder component can be obtained by careful control of the micronic particles which are incorporated in the binder component. According to the present invention, the micronic inorganic constituent of the binder component contains between 27.5 and 35% by weight or volume spheroidal particles, preferably about 30% (i.e. between, say 30.0% and 33.4%). Also according to the invention, the micronic constituent is preferably in an amount of about 32 to about 40% of total binder.

Thus, the invention provides for the addition to an organic binder of a very fine-grained or micronic filler which may also have some pigmenting function to produce an agglomerated material which, while containing a low percentage of binder and despite the fact that one would normally expect the addition of the filler to reduce the wetting power of the binder with respect to the large-grained aggregate, will after hardening possess properties better than those of known aggregate materials while its cost price is highly competitive. It has already been pointed out that it is essential for the present purposes that this micronic filler has a particle size well below 2 microns and be of high shape regularity, in terms of the proportion of grains having a substantially spherical configuration. The grains must be hard and should advantageously be nonporous in relation to the organic matrix in which they are incorporated.

It has been found that the desired qualities of the micronic filler are to be found in titanium dioxide, especially in a mixture of anatase and rutile to obtain the desired proportion of generally spheroidal particles. Thus, while the use of anatase, which in its customary form contains substantially no spheroidal particles, alone will not be effective even if it is in a particle size below 2 microns, a mixture of approximately two parts anatase with one part rutile will be effective in accordance with the present invention and is the preferred composition for the micronic constituent. It should be noted also that, while rutile contains a predominant proportion of generally spheroidal particles, it alone as the micronic constituent, is not effective. On a secondary level, therefore, my invention resides in the discovery that a blending of anatase and rutile in the indicated proportion of about 2:1 provides a marked improvement in the properties of the hardened product which could not be foreseen from systems using anatase alone or rutile alone. The micronic filler may comprise pigments used in the wall-facing and paint industry which also serves to impart opacity or coloration of the resin-containing composition.

The aggregates which may be agglomerated with the improved binder component according to the invention, may be any of the aggregates used heretofore in hydraulic or resin-binder compositions, although I prefer to employ sand and in a particle-size order of magnitude greater than that of the micronic filler. Thus, the sand may have a particle size ranging from, say, 1 mm. to 80 microns, the aggregate further comprising advantageously a siliceous extender with a particle size in the range of 2 microns to 80 microns. With polyester resins, I prefer to use a resin proportion in the hardenable composition of 7–13% by weight, while 2 to 7% by weight is preferred for epoxy resins.

As noted, the surprising relationship between the proportion of spheroidal particles, the specific binders and the nature of the micronized filler, to produce an improved hardened product, is not fully understandable at the present time. However, I believe that the following explanation pertains:

The grains of the micronic filler, which, in blending with the resin are thoroughly coated with organic binder, penetrate into all of the interstices between the aggregate particles to be agglomerated, because of their fineness and spheroidal shape by a process which is analogous to lubrication. The aggregate particles are covered along their surfaces with the micronic resin-coated filler particles. On solidification of the binder by chemical and/or physical action, the binder causes the grains to adhere to one another and to the micronic particles covering them. The result is a body of high density using a small proportion of organic binder. Since the proportion of binder is low, the material is practically impermeable to liquid but is permeable to gases, thereby allowing gaseous exchange to take place across a wall formed by the hardened composition and making the same highly desirable for the construction of dwellings. This characteristic also permits the hardened product to be used for casting molds and other foundry purposes.

The improved physical properties of the hardened product can possibly be explained by observing that, in the agglomerated material, according to the invention, adhesive joints are constituted by the hardened binder coating the grains of the micronic filler so that these joints are under shearing stress rather than a tearing stress as in the case of omission of the micronic filler, so that there is no significant distance between particle surfaces which are spanned solely by the resin.

(6) Description of the drawing

The above and other objects, features and advantages of the present invention will become more readily apparent from the following description, reference being made to the accompanying drawing in which:

FIGS. 3–1 through 3–11 are a set of graphs illustrating physical properties of compositions, according to the various tests;

FIGS. 4–1 and 4–2 are graphs illustrating comparative tests;

FIGS. 5 through 7 are semilogarithmic plots of viscosity versus mechanical disturbance illustrating the equiviscosity principle according to the invention;

Figures 1, 3:
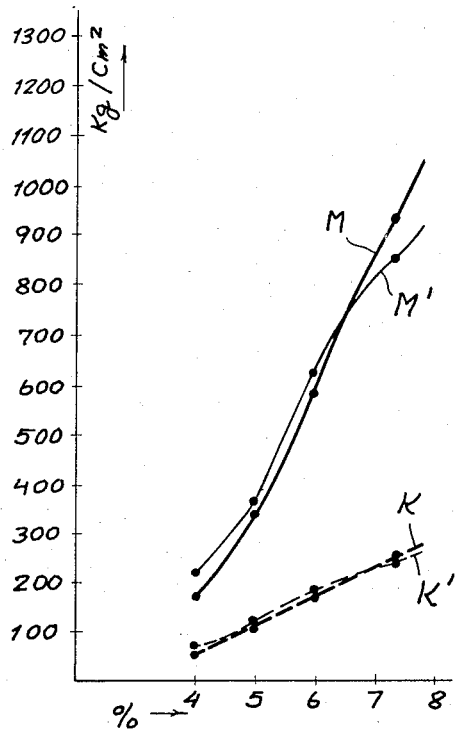
Figures 2, 3:
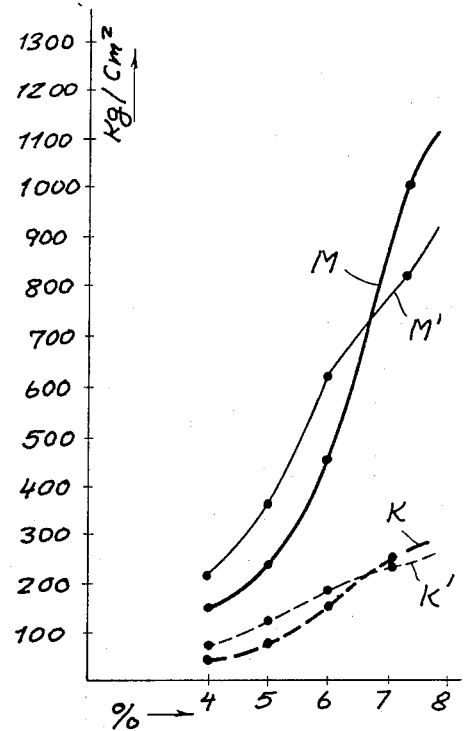
Figure 3:
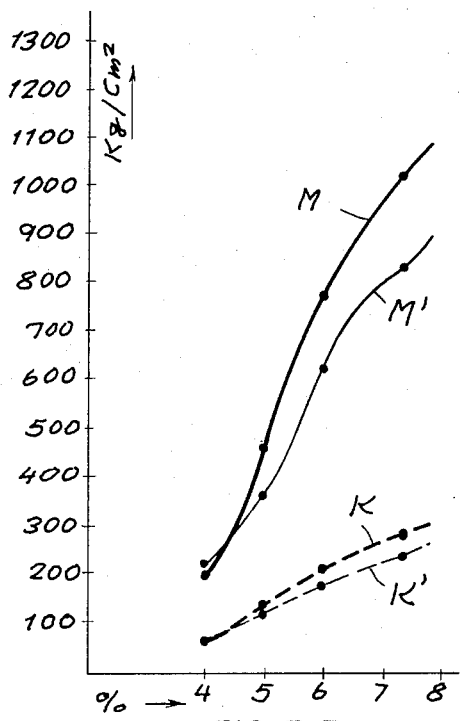
Figures 3, 4:
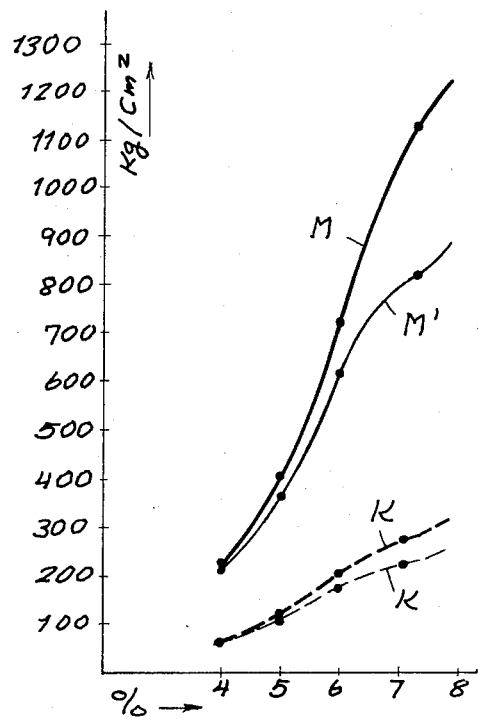
Figures 3, 4, 5:
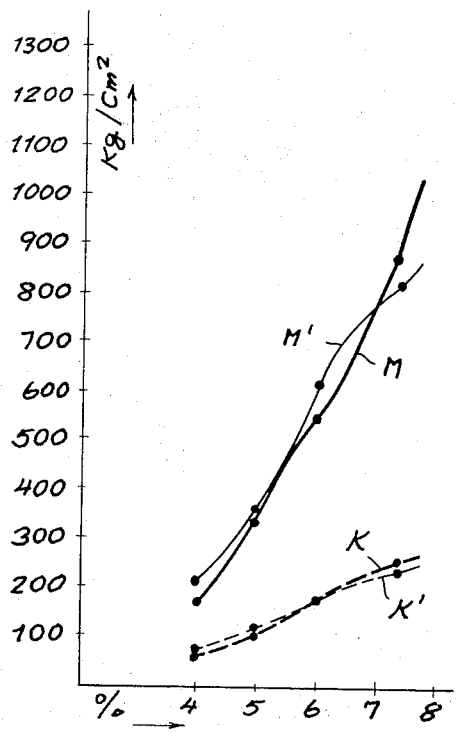
Figures 3, 4, 5, 6:
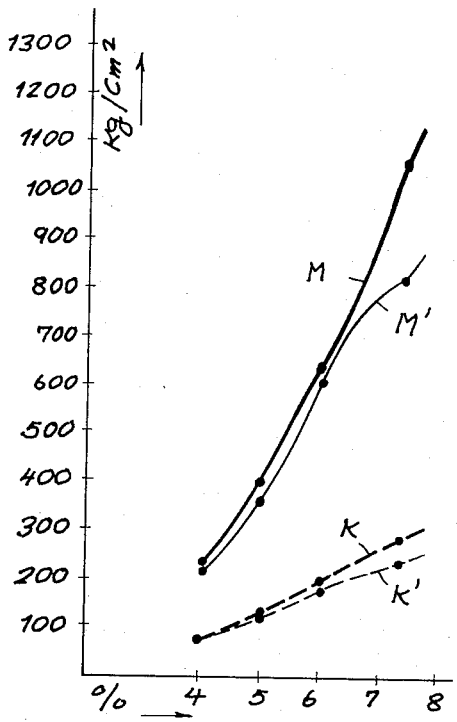
Figures 3, 4, 5, 6, 7:
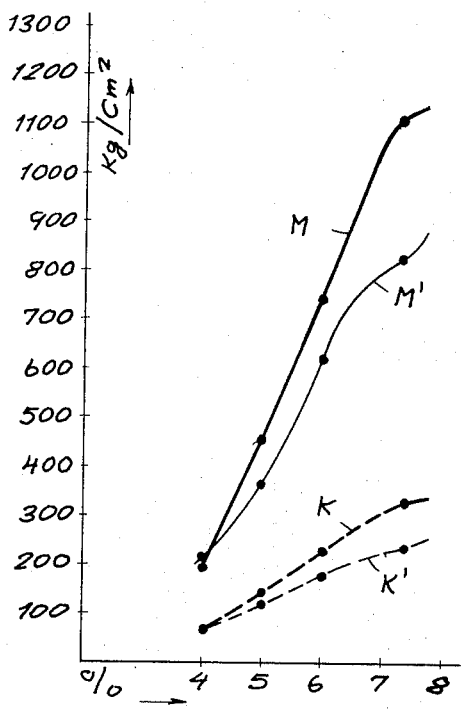
Figures 3, 4, 5, 6, 7, 8:
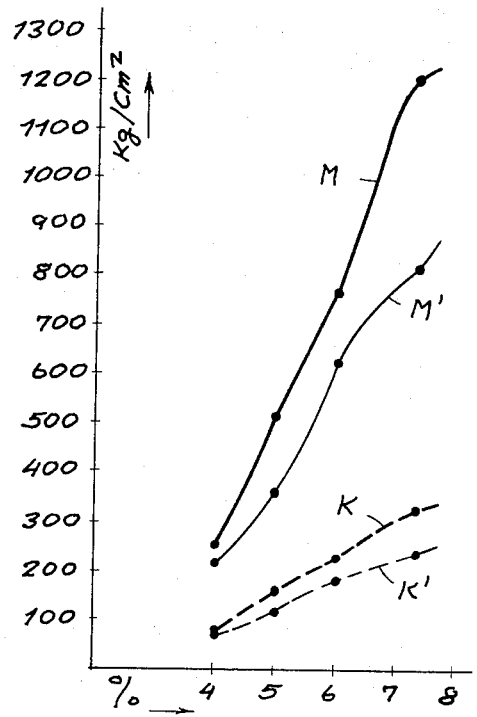
Figures 3, 4, 5, 6, 7, 8, 9:
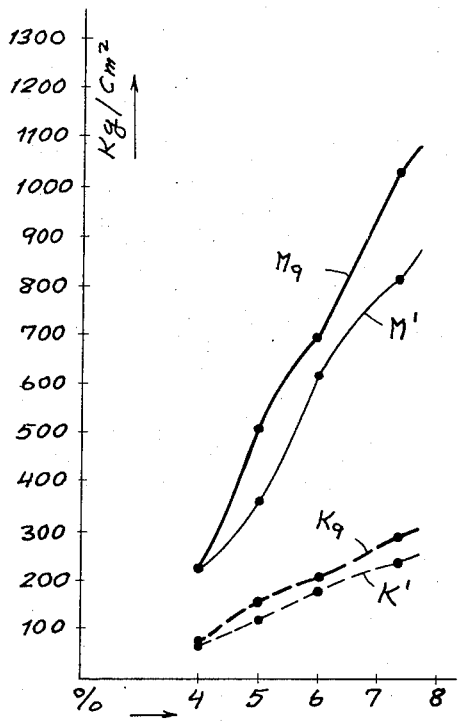
Figures 3, 4, 5, 6, 7, 8, 9, 10:
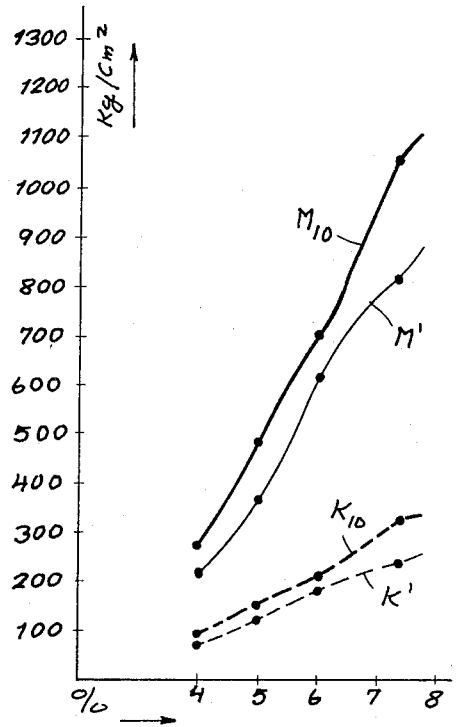
Figures 3, 4, 5, 6, 7, 8, 9, 10, 11:
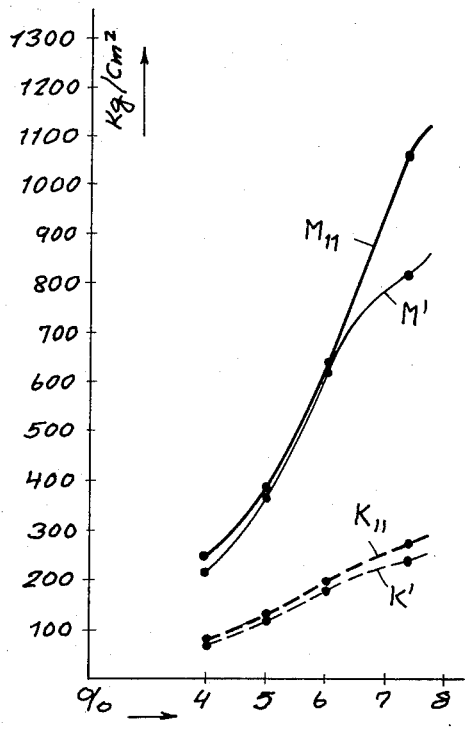
Figures 1, 4:
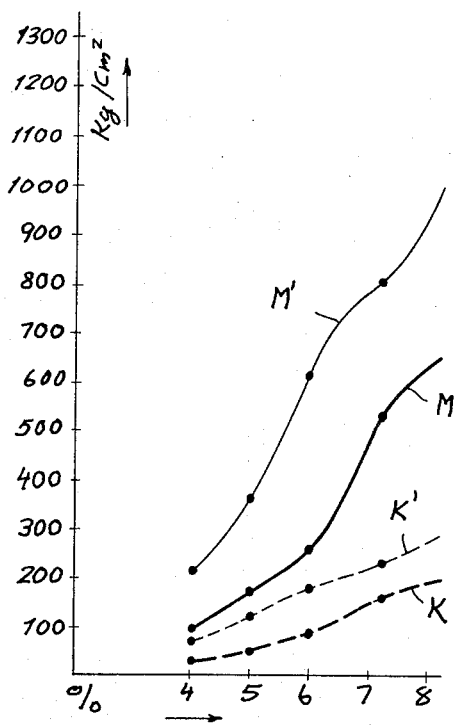
Figures 2, 4:
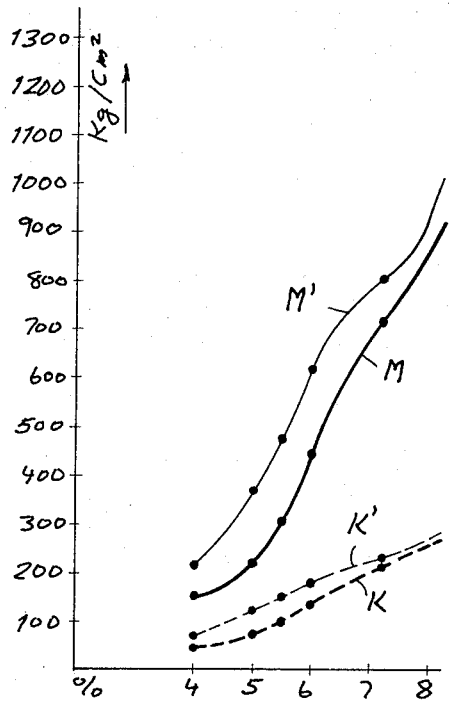
Figure 7:
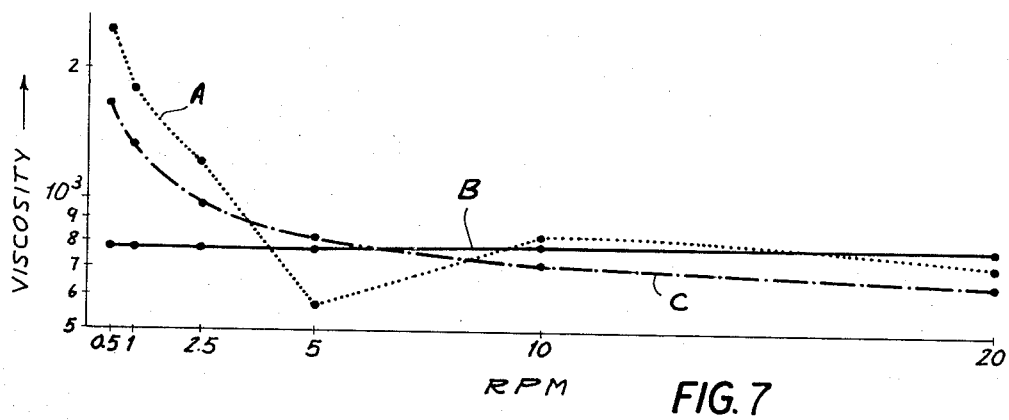
Figure 6:
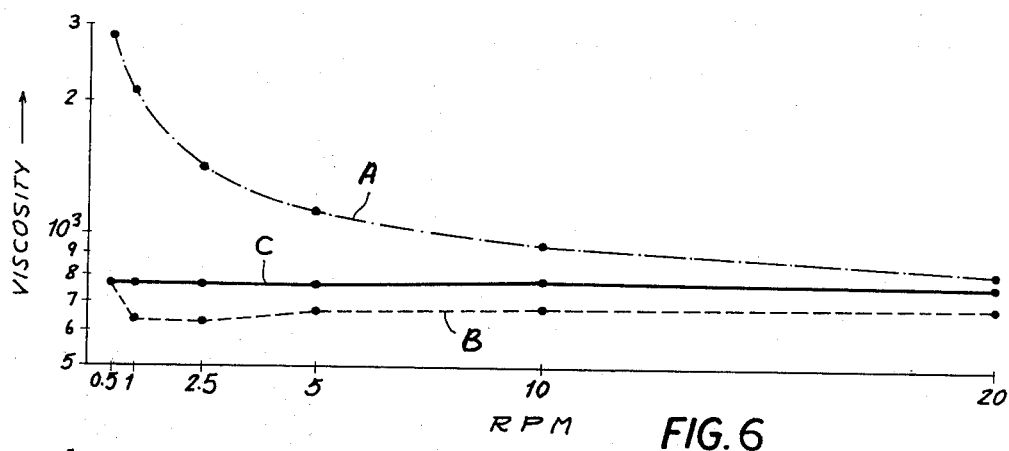
Figure 5:
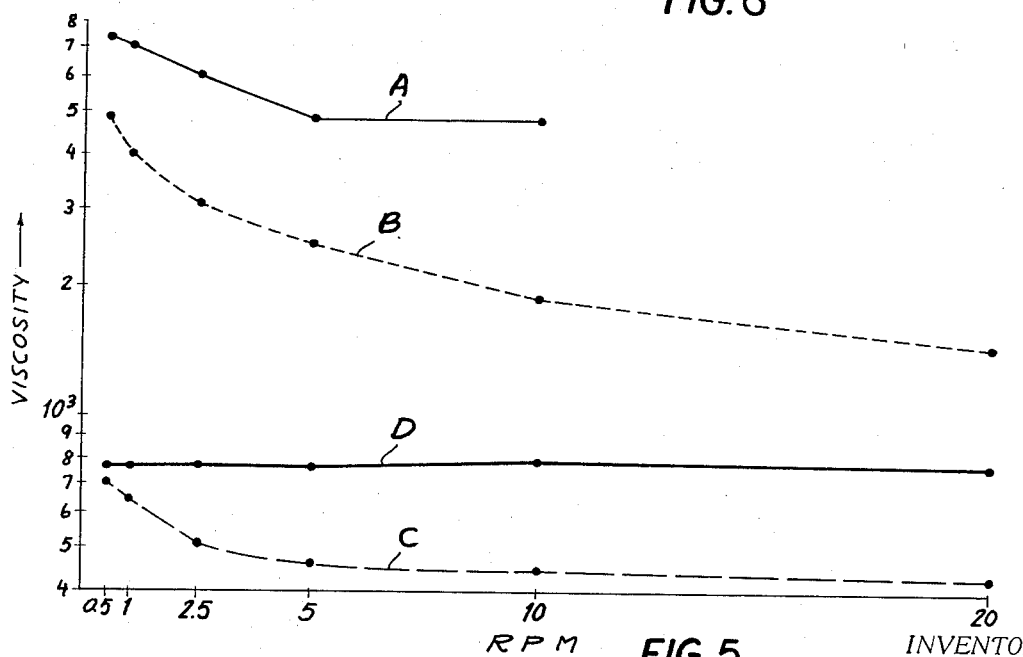
Figure 8:
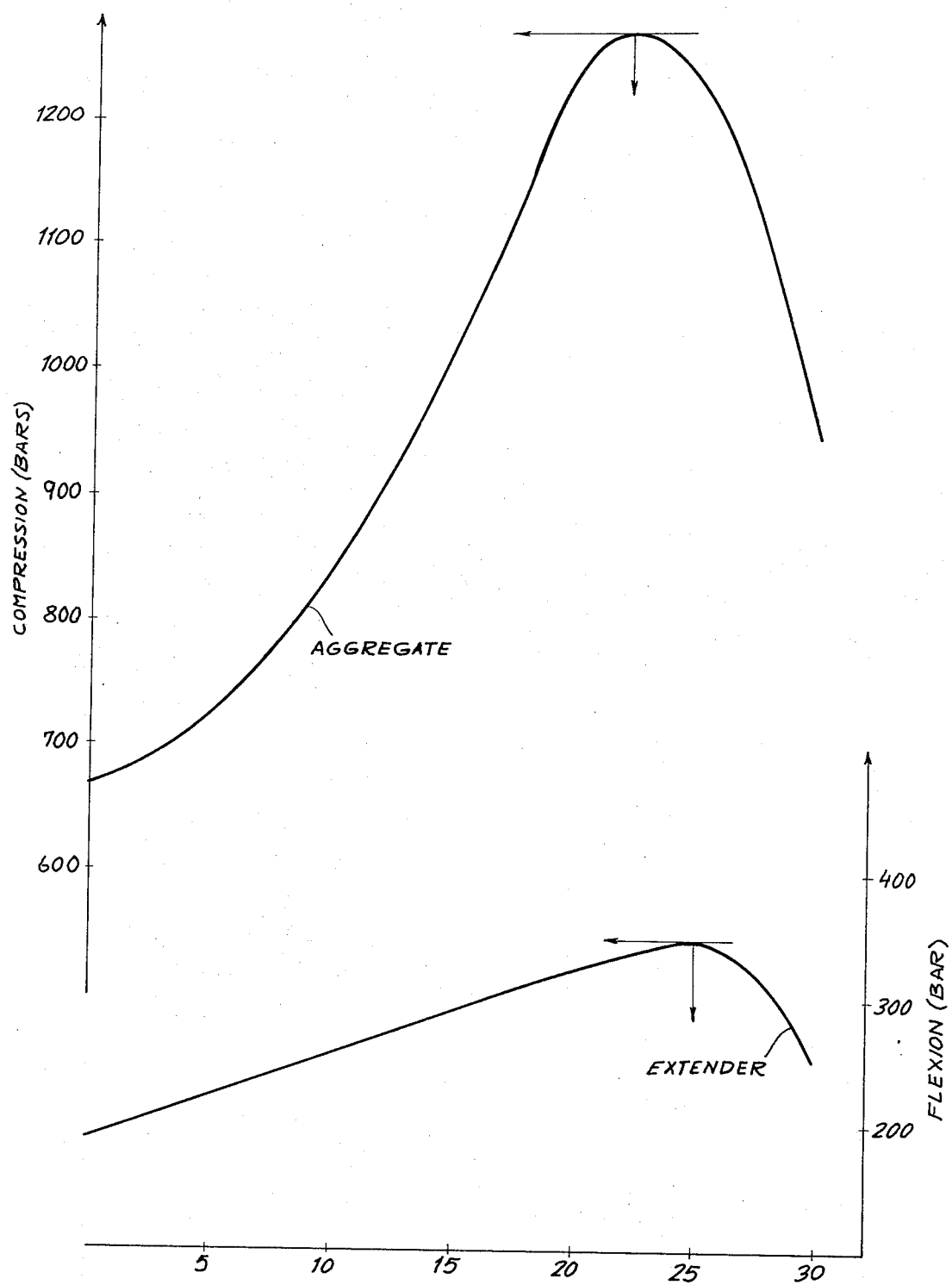
Figure 9:
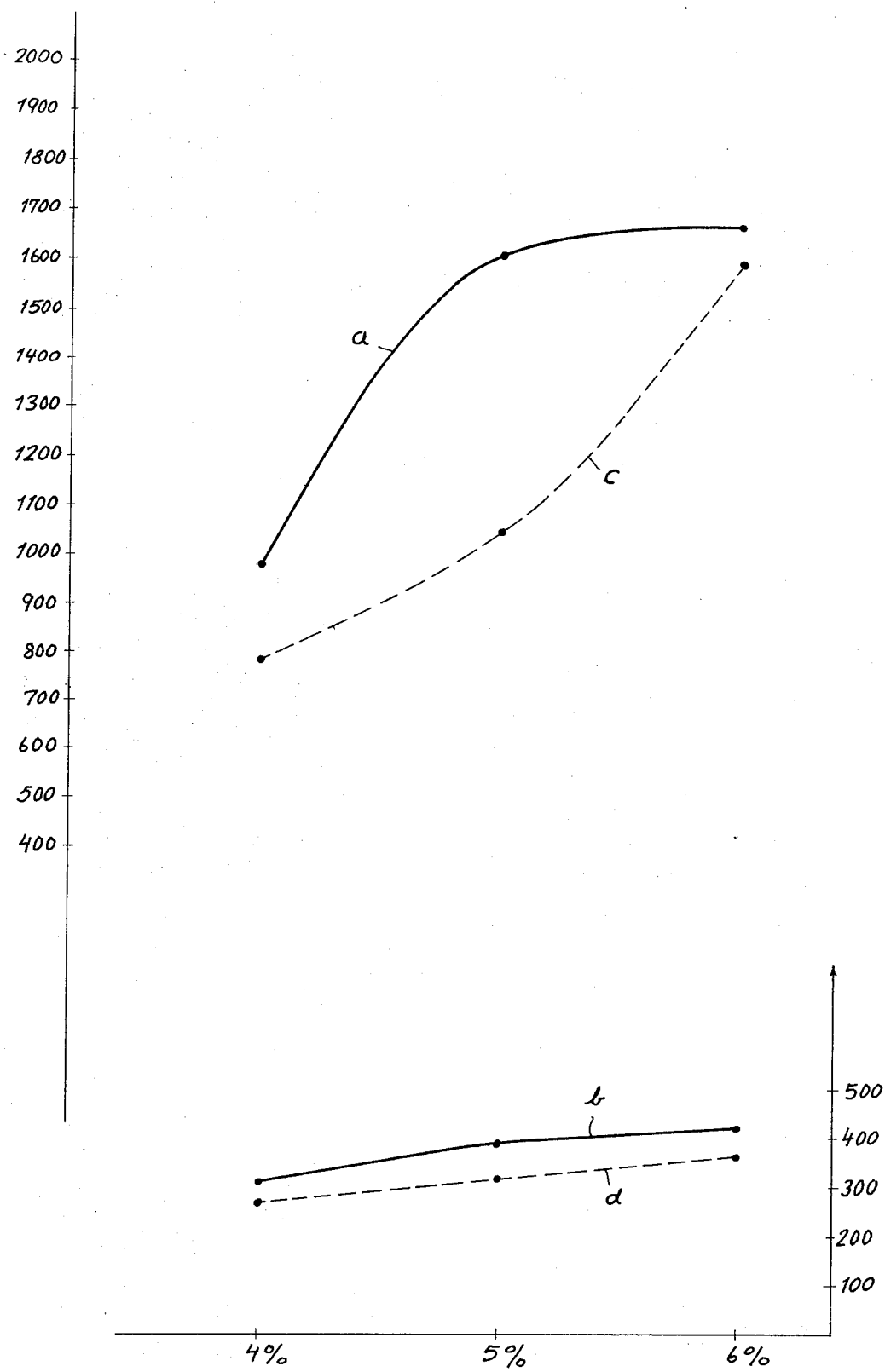
Figure 10:
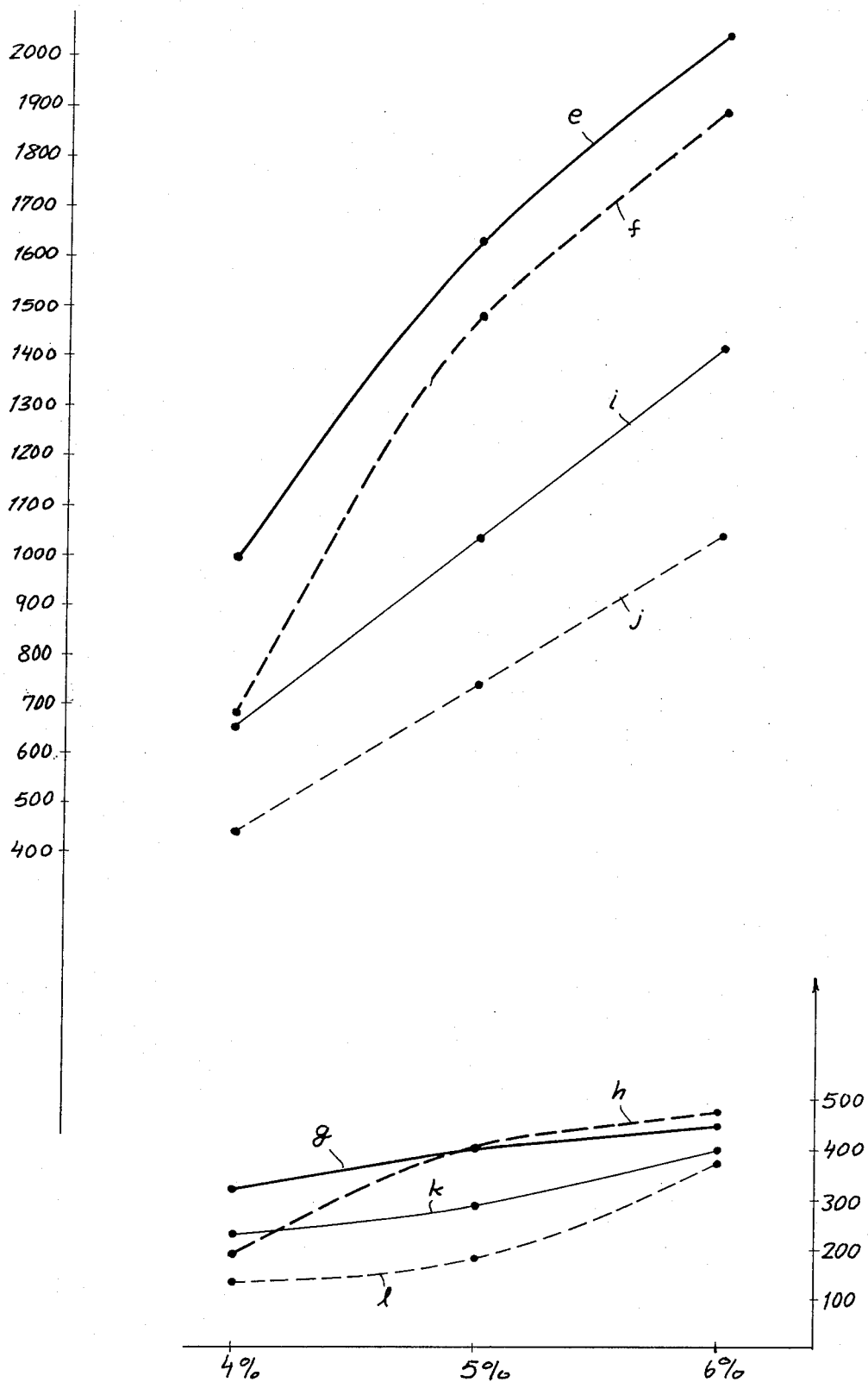

FIG. 8 is a graph representing the relationship of resistance to compression (plotted along the left ordinate) and resistance to compression (plotted along the left ordinate) and resistance to flexion (plotted along the right ordinate) to percent of the aggregate and extender (plotted along the abscissa); and FIGS. 9 and 10 are graphs illustrating the results obtained in connection with Example 8a.

(7) Specific description

The invention is applicable with various micronic fillers, whether pigmenting fillers or not, but relates more particularly to the application of titanium dioxide as filler for an organic binder for the purpose of producing an agglomerated material. Not only are the best mechanical characteristics obtained for the agglomerated material with a filler of this type, for a determined percentage of binder, but in addition the aggomerated material then has an appearance which is very favorable to its application for building purposes.

Tests have shown that the structure of the micronic filler is not immaterial, and in this connection the invention provides for the use of titanium dioxde in its two main known forms, namely anatase and rutile, mixed together and preferably in a ratio of about two parts of anatase to one part of rutile.

The improved agglomerated material according to the invention makes use in a general way of various organic binders, particularly resins, and, among the latter, advantageously utilizes epoxy resins, polyester resins, and polyurethane resins.

The setting factor is selected in each case in dependence on the resin and also on the general conditions which have to be fulfilled for the agglomeration.

I—RAW MATERIALS

(A) Aggregates

A characteristic of the agglomeration process according to the invention is that it is applicable to a wider range of aggregates of very different natures and very diverse particular states, both from the point of view of granulometry and from the point of view of shape, so that they can be selected in accordance with the mechanical characteristics required for the agglomerated material.

Among aggregates which can be agglomerated by the present process the following may be mentioned:

(a) Sands, stone and gravel such as those normally used for making ordinary concrete with a hydraulic binder;

(b) Sands considered not to be utilizable for making concrete because of the laminar character of a high proportion of their particles;

(c) Dune sands, considered to be useless for making concrete because of the traces of sodium chloride which they contain;

(d) Mortar sands; and (e) Sands used for the production of foundry molds; mineral, vegetable, or animal waste.

(B) Fillers

In the event that the granulometry of the aggregate does not extend sufficiently towards small particle sizes, it is likewise a feature of the invention to add comminuted solids to the actual aggregate, that is to say to add a material whose granulometry is similar to that of cement and which for example extends almost continuously from about 80 to about 2 microns.

Among these conditions, silica is advantageous because of its low price, its low porosity, and its relatively great hardness.

Among other fillers which have been successfully used, mention may be made of treated or untreated calcium carbonates, but the naming of these fillers is not intended as a limitation upon the scope of my invention.

As an example, the following is a formulation for the agglomeration of aggregates with an extended range of particle sizes for the purpose of producting concrete:

|  | Percent |
|---|---|
| Crushed basalt black 12/18 mm. | 33.27 |
| Rounded river aggregates ⅜ mm. | 19.12 |
| Rounded river sand comminuted to 2 mm. | 32.62 |
| Fine white silica (extender) | 14.99 |

The percentage of the charge (extender) is determined, for a given aggregate, by a technique analogous to that used in the production of hydraulic cements and mortars. This determination consists, for a given aggregate, in testing various proportions of aggregate and extender in a system of the binder composition of interest. The result is a graph or a characteristic curve as seen in FIG. 8 in which the resistance to compression of the composition for various extenders and aggregates is shown along the abscissa.

For a given aggregate, e.g. Falleron sand ($> 80\mu$), the quantity of the extender chosen, e.g. silica ($2$–$80\mu$), with a granulometry between 2 and 80 microns, is that which corresponds substantially to the maximum of the graph of resistance to compression and of flexion as a function of present composition.

(C) Organic binders

The organic binders forming part of an agglomerating composition according to the invention may be every applicable compound, that is to say any compound capable of complying with conditions entailed by various practical uses.

Among the binders which can be used for carrying out the process according to the invention, the following are mentioned by way of examples:

phenoplasts and compounds thereof,
aminoplasts and compounds thereof,
ethoxylenes or epoxides and compounds thereof,
certain silicone resins in their various physical states,
certain polyacrylic resins,
alkyd resins and compounds thereof,
polyester resins and compounds thereof,
certain compound, plasticized sulphur-based resins,
resins of the Escorez type,
furan resins and compounds thereof.

Mention may also be made of certain protein-based plastic materials.

This list is not restrictive and does not excludue any organic binders, such as resins, which may be proposed afterwards and which have properties enabling them to be used in an agglomerating composition according to the invention.

The resins may be used singly or associated with one another, according to their compatibility.

In an advantageous embodiment, the organic binder is an epoxy resin, particularly the Araldite known as GY-255, which has a density of 1.150 at 20° C., an epoxy equivalent of 175–185, and a viscosity at 25° C. of 5000–6400 cps. and at 20° C. of 10,000–11,000 cps.

According to another embodiment, the organic binder is a polyester resin, particularly the resin known under the name Rhodester 3016 BL, the characteristics of which are as follows:

density: 1.11
viscosity at 25° C.: 1.8–2.5 poises
coloration less than or equal to: 125 alpha
acid number: about 40
hydroxyl number: about 55
styrene content: 38.5%

(D) Additives

Depending on the required characteristics of the final product, the following additives may be added to the resin or resins: diluents, dispersing or plasticizing agents, in their various physical states—it being nevertheless observed that the need of such additions is not as essential, for the purpose of complying with conditions of wettability, as in cases where the binding composition is solely a resin or a mixture of resins of low wetting power. When necessary it is therefore possible, with an agglomerating composition according to the invention, to dispense with a plasticizer, dispersing agent, or diluent, or else plasticizers, diluents or dispersing agents may be selected which best assure the stability of the final material, these agents being in particular selected in accordance with the final mechanical characteristics required, with wettability only a minor consideration.

(E) Micronic filler

The presence of this filler is characteristic of the agglomerating composition according to the invention. The mixture composed of the resin or resins or other organic binders, optionally containing one or more additives, together with the micronic filler constitutes the binding composition of the invention effecting the agglomeration of the aggregate when the setting action is developed.

The micronic filler, whether of a pigmenting nature or not, is selected from fillers complying with the following conditions:

They should be in the highest possible state of fineness, in principle with a granulometry below 2 microns, or be capable of reduction to that state by mixing and preferably grinding with the binder or, if compatibility permits, in the course of the production of the binder;

They should preferably be of a hard material, that is to say of a basic hardness greater than or equal to that of the aggregate to be agglomerated;

They should be of a material which is non-porous or has relatively low porosity in relation to the binder;

They should be comopsed of grains approximating as closely as possible the spherical shape, at least with regard to a substantial proportion of them, which may be the order of 30%;

They should be inert from the chemical point of view in relation to the other constituents; and Optionally, they should impart the desired color to the final material.

Among micronic fillers which can be used for carrying out the process according to the invention, mention is made of the following:

Treated or untreated, pigmenting or non-pigmenting mineral fillers;

Treated or untreated, pigmenting or non-pigmenting metallic oxides; and

Mixtures of mineral fillers and metallic oxides, optionally with the addition of other substances having fine granulometry, such as powdered metals.

If possible, a filler is selected which can be incorporated in the binder in any stage of its production or of the preparation of the material.

According to a particularly advantageous embodiment, the micronic filler is titanium dioxide in the anatase and/or rutile form.

Rutile has a mean specific gravity of 4.2 g. per cc.; anatase has a mean specific gravity of 3.9 g. per cc.

The MOHS hardness is:

in the case of rutile: 6-7;
in the case of anatase: 5.5-6.

Absorption of binder (measured as oil intake) is very low: 16 to 20 for rutiles and 19 to 21 as a rule for anatases, depending on their treatment.

The granulometry of rutile covers a range from about 0.25 to about 1 micron.

That of anatase covers a range from about 0.15 to about 1.3 micron.

In the rutile forms, titanium dioxides have very regular, practically spherical configurations.

(F) Curing factor

The curing factor is obviously selected in dependence on the binder to which it is intended to be applied. Among curing factors mention may first be made of curing agents. In general, the curing agent must be combined with the binder without leaving a volatile residue. A curing agent serving as a reactive diluent for the resin is preferable.

As an example, for the curing of an epoxy resin of the Araldite GY-255 type, a curing agent known under the name of Synolide 960, manufactured by Gray Valley Products, was advantageously used, its characteristics being given below:

Viscosity: 1 to 3 strokes at 25° C.
KOH equivalent: 350-380 mg./g.
color: 4 PRS max.
Density: about 0.94 at 15° C.

For the curing of a polyester resin of the Rhodester 3016 BL type, use was advantageously made of Perlygel CR, dimethylaniline being added in the binder.

The curing factor may likewise be a physical factor, such as heat and/or humidity.

Curing may also be effected by the simultaneous application of a curing agent and a physical factor.

(G) Proportions of constituents

An essential characteristic of the process consists in the fact that the proportion of organic binder used in the process of the invention and included in the material is relatively low, and in all cases much lower, for specified mechanical characteristics, than when the aggregate is agglomerated with the aid of the same binder alone, possibly with additives. For a granular-concrete formula the saving in binder may be ¾ referred to the amounts recommended in published reports, because of the intervention of the micronic filler which facilitates the placing in position of the aggregate particles.

In the case of the process according to the invention, using an epoxy resin to which a micronic filler is added, proportions of total binder (resin and curing agent) in the case of mortars, of between 4 and 7% of the total weight of the formulation leads to advantageous mechanical strengths even for materials to be agglomerated whose granulometry is not favorable, such as fine aggregates, known as silico-calcareous sands, where granulometry ranges from 0 to 3 mm. In the case of concretes, the proportion is between 2 and 5%, depending on the granulometry of the aggregate. For a polyester resin the proportions, for mortars, are generally between 8 and 13% of the total for concretes they range between 7 and 10%.

It is therefore clear that the agglomerating power of the agglomerating composition according to the invention, which contains not only the binder and the curing agent but also the micronic filler, is far greater than that of the binder alone, so that for the same percentage of binder there is an improvement of the mechanical characteristics of the material and a lack of gas and vapor tightness, while impermeability to liquids is obtained along with a saving of work.

The adhesion obtained between the constituents of the agglomerated material is excellent, usually greater than the inherent strength of the aggregate, despite the low percentage of binder.

The proportion of micronic filler varies in accordance with the binder and aggregate used, with the granulometry of the latter, and also with the more or less regular shape of the aggregate particles. Limits are of the order of 25 to 75%, in terms of the binder composition.

Below a certain proportion of micronic filler the mechanical characteristics of the agglomerated material deteriorate sharply.

For a binder composition comprising an epoxy resin and a pigment filler based on titanium dioxide, a proportion of the order of 25% titanium dioxide in the composition is a minimum.

It has been observed that in many cases optimum results correspond to a binder composition having equi-viscosity, that is to say its viscosity measured in a Brookfield-type viscosimeter at constant temperature does not vary with the speed of rotation of the needle.

II—PREPARATION

This consists of the mixing and/or treatment of the components intended to supply the agglomerated material.

This mixing and treatment are carried out in an order and in a manner which depend on the components selected and also on working facilities.

The filler is usually mixed with the actual aggregate.

The binder composition according to the invention, characterized by the simultaneous presence of the hardenable organic binder and of the micronic filler, may be prepared before being mixed with the filler-laden aggregate.

The micronic filler may be added to the organic binder, for example to the resin or resinous composition.

It may also be added during the production of the binder or of one of the constituents of the binder.

The curing agent is added at the opportune moment, either to the binder composition before mixing with the filler-laden aggregate, or in the course of this mixing.

When the curing is brought about by a physical factor, or when a physical factor contributes towards the curing, this physical factor is applied after all the constituents have been mixed.

The mixing of organic binder, micronic filler, hardener, and aggregate including filler is usually effected at opportune moments in a fixed-bowl blade-type mixer with planetary rotation.

Before introduction of the filler-laden aggregate, the micronic fillers are intimately ground in the binder until a fineness of grinding is obtained which is measured at 8–10 points on a North gauge.

In the case of epoxy resins, the filler-laden aggregate is advantageously brought to a temperature higher than ambient temperature, for example of the order of 40 to 65° C. min. This rise in temperature may be obtained by previously heating the aggregate or else through the heating action of the wall of the mixer.

This heating of the aggregate is carried out not only in the case of an epoxy resin but also in the case of any resin which will retain sufficient working time and/or which contains no elements which are too volatile at that temperature.

The proportion of agglomerating composition and aggregate has previously been determined in order to obtain optimum coating, which corresponds to the disappearance of lumps in the paste.

The paste so obtained is placed in molds.

In practical working in a factory or on the site, it is possible to operate, depending on circumstances, with or without static pressure or else by combining static pressure with vibratory pressure.

For the production of test pieces, the paste was subjected to constant static pressure during a predetermined period of time, in order to enable the results obtained to be compared.

III—EXPLANATORY HYPOTHESIS

It is thought that the micronic filler, whose grains are basically of a diameter smaller than 2 microns and are treated with resin, acts towards the particles of the aggregate or filler in a manner similar to that of a lubricant by enabling relative motion of the particles to move in order to enable them to come as close as possible to one another.

This conception is supported experimentally by the following finding: When the aggregate is mixed with the agglomerating composition according to the invention, all this material forming a heap, the particles are displaced in relation to one another in order to assume the closest positions, as explained above, which takes place after relative movements of particles which under the microscope appear to be situated at random, the heap resembling an enormous ant hill.

Another confirmation of the above explanation is supplied by the particularly high density of the agglomerated materials obtained by the process according to the invention, this density being higher than that obtained by using a resin and curing agent alone, with the same concentration and all other conditions being the same.

Figure 1:
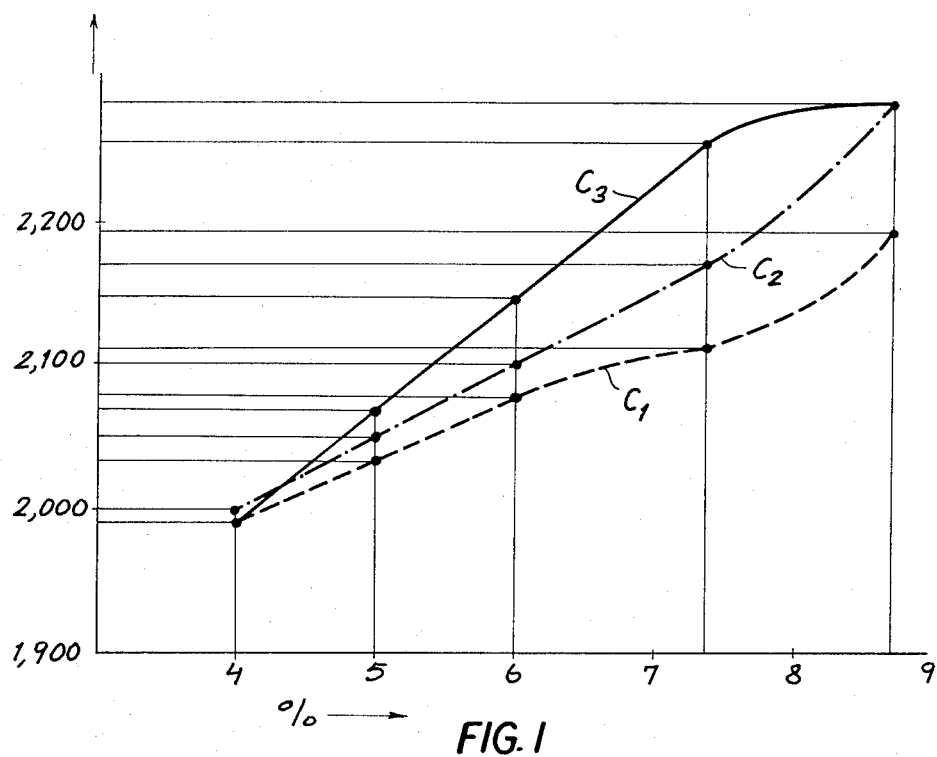
FIG. 1 is a set of graphs showing density versus proportion of binder for various compositions.

In FIG. 1, the percentage of total binder (resin and curing agent) is plotted on the abscissa and density on the ordinate. The curve C1 shows the variation of the density of agglomerated materials without micronic filler added to the resin, which in this case is Araldite.

The curve C2 is obtained under identical conditions, but with a micronic filler, namely iron oxide, mixed with the resin (Araldite) in the proportion of 58% Araldite to 42% iron oxide.

The curve C3 is obtained under the same conditions, but with a titanium dioxide filler (42% by weight) containing twice as much anatase as rutile mixed with the Araldite.

Figure 2:
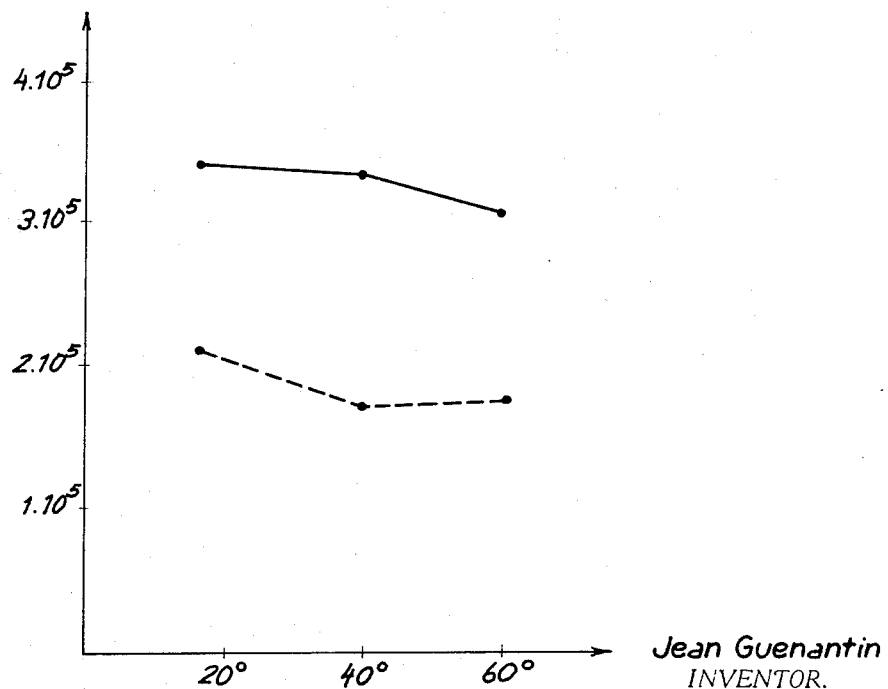
FIG. 2 is a set of graphs of the modulus of elasticity versus temperature.

FIG. 2 shows in solid lines the variation in the modulus of elasticity in dependence on temperature, as determined on concrete test pieces prepared from the same aggregate. The graph in solid lines relates to test pieces whose agglomeration was effected with a binder composition according to the invention, comprising an epoxy resin and a micronic filler, the total binder (resin and curing agent) amounting to 5% by weight of the total of the formulation.

The graph in broken lines corresponds to test pieces containing 10% of total binder referred to the total formulation for the same resin and the same curing agent, without micronic filler.

(8) SPECIFIC EXAMPLES

A—Examples using an epoxy resin

EXAMPLE 1

The starting material comprised a normal silicocalcareous sand complying with the following standardized mean granulometry:

| Screen No.: | Diameter of mesh in mm. | Percentage screen retention |
|---|---|---|
| 38 | 5.00 | 0.03 |
| 35 | 2.50 | 8.70 |
| 32 | 1.25 | 23.67 |
| 29 | 0.63 | 37.08 |
| 26 | 0.315 | 24.80 |
| 23 | 0.160 | 5.40 |
| 20 | 0.080 | 0.30 |
|    | <0.080 | 0.02 |

The sand was dried for 24 hours at 120° C.

With this dry sand there was mixed a fine white silica complying with the following granulometry expressed in cululative percentages, as obtained by densimetry:

|  | Percent |
|---|---|
| Lower than 2$\mu$ | 7.2 |
| Lower than 20$\mu$ | 21.9 |
| Lower than 50$\mu$ | 28.5 |
| Lower than 60$\mu$ | 44.4 |
| Lower than 100$\mu$ | 86.2 |
| Lower than 200$\mu$ | 99.4 |

70% ±4% of sand was mixed with 20% of fine silica.

An epoxy resin of the Araldite GY–255 type was used as the resin.

The micronic filler consisted of 180 F Bayer red iron oxide with the following granulometry: Residue remaining on screen of 16,900 mesh per square cm., in percent: 0.05.

The composition of the binder composition was:

|  | Percent |
|---|---|
| Araldite GY–255 | 58 |
| Red iron oxide | 42 |

Use was made of a curing agent such as for example Synolide 960, in an amount equal to 50% by weight of the Araldite.

The amount of curing agent indicated here is not critical; it depends on the mass used (exothermic reaction) and the conditions of preparation.

The process of operation is as defined above.

Five series of tests were carried out, distinguished from one another by the percentage of total binder (resin plus curing agent) referred to the total formulation.

The results of the tests are shown in the table following, which is made up as follows:

In column $a$, the percentage of total binder (resin and curing agent) referred to the total formulation;

In column $b$, the density of the cured sample;

In column $c$, bending strength is kg. per square cm. (mean of three tests) of test pieces after curing for four days;

In column $d$, compressive strength, in kg. per square cm. (mean of six tests), of the test pieces after curing for four days;

In column $e$, the ratio of the values of compressive and bending strengths;

In column $f$, the percentage of voids.

| a | b | c | d | e | f |
|---|---|---|---|---|---|
| 4.01 | 2.000 | 55.12 | 171.62 | 3.1156 | 13.536 |
| 5.01 | 2.050 | 111.37 | 339.78 | 3.0509 | 11.512 |
| 6.01 | 2.0985 | 176.81 | 582.30 | 3.2934 | 8.328 |
| 7.36 | 2.1697 | 248.25 | 916.46 | 3.6917 | 2.616 |

The curves in FIG. 3–1 illustrate these results. Curve K gives the values of the bending strength for the agglomerated material obtained in accordance with Example 1, plotted against the percentage of total binder, that is to say of resin and curing agent. For purposes of comparison, curve K′ gives the values of the bending strengths of agglomerated materials obtained under the same conditions, but without a micronic filler. Curves M and M′ relate to the compressive strength for a material in accordance with Example 1 and for a material without micronic filler.

EXAMPLE 2

The aggregate is the same as in Example 1.
The epoxy resin is the same as that in Example 1.
The pigmenting filler is zinc oxide of pigmenting quality.
The binder composition is:

| | Percent |
|---|---|
| Araldite GY-255 | 58 |
| Zinc oxide | 42 |

The operating procedure is the same as in Example 1.
FIG. 3–2 shows the diagrams obtained under the same conditions as in Example 1, but for this binder composition.

EXAMPLE 3

The procedure is the same as in the preceding examples, but the binder composition is as follows:

| | Percent |
|---|---|
| Araldite GY-255 | 58 |
| Rutile titanium oxide RL-21 | 42 |

The curves in FIG.3–3 have the same significance as in the two preceding figures, but relate to this example.

EXAMPLE 4

The procedure is carried out under the same conditions as in Examples 1 to 3, but the binder composition is as follows:

| | Percent |
|---|---|
| Araldite GY-255 | 58 |
| Untreated anatase titanium dioxide (ATI) | 42 |

The curves in FIG. 3–4 have the same significance as the curve in the preceding figures, but relates to this example.

EXAMPLE 5

Procedure is the same as in the preceding examples, but the binding composition is as follows:

| | Percent | |
|---|---|---|
| Araldite GY-255 | 58 | |
| Rutile titanium dioxide RL-21 | 9.69 | 42 |
| Peintal | 32.31 | |

Peintal is a pigment extender composed of treated aluminum oxide, the granulometry of which ranges from 6 to 9$\mu$.
The curves in FIG. 3–5 have the same significance as in the preceding figures, but relates to this example.

EXAMPLE 6

The procedure is exactly as in the preceding examples, but the binder composition is as follows:

| | Percent | |
|---|---|---|
| Araldite GY-255 | 58 | |
| Zeolox thixotropic filler | 5.52 | 42 |
| Rutile titanium dioxide | 36.48 | |

Zeolex is a sodium silico aluminate the granulometry of which extends from 0.2 to 0.3$\mu$ and which is used as a thioxatropic pigment extender.
The curves in FIG. 3–6 have the same significance as in the preceding figures, but relate to this example.

EXAMPLE 7

The procedure is as in the preceding examples, but the binder composition is as follows:

| | Percent | |
|---|---|---|
| Araldite GY-255 | 47.06 | |
| Anatase titanium dioxide AT-1 | 35.29 | 52.9 |
| Rutile titanium dioxide RL-21 | 17.65 | |

The curves in FIGS. 3–7 were plotted under the same conditions as the previous curves, but for this example.

EXAMPLE 8

The procedure is as in the preceding examples, but the binder composition is as follows:

| | Percent | |
|---|---|---|
| Araldite GY-255 | 58 | |
| Anatase titanium dioxide AT-1 | 28 | 42 |
| Rutile titanium dioxide RL-21 | 14 | |

The results of the tests are summarized in the following table:

| a | b | c | d | e | f |
|---|---|---|---|---|---|
| 4.01 | 1.9933 | 77.78 | 255.56 | 3.239 | 12.400 |
| 5.01 | 2.0716 | 159.98 | 511.55 | 3.260 | 8.528 |
| 6.01 | 2.1493 | 226.03 | 779.35 | 3.397 | 5.008 |
| 7.36 | 2.2565 | 326.24 | 1203.81 | 3.892 | |

The curves in FIG. 3–7 were ploted under the same
The latter are particularly good, especially for total binder proportions between 5 and 7%.

EXAMPLE 8a

As described in the preceding examples, a composition is prepared with the following constituents:

| | Percent by weight |
|---|---|
| Epoxy resin | 58 |
| Anatase | 28 |
| Rutile | 14 |

The resin is a diglycidilether of an aromatic amine and is used with an aliphatic polyamine hardener, the latter being in a ratio to the resin by weight of 20%.
The graph of FIG. 9 illustrates the results of tests on the composition 24 hours after preparation. In this graph, the resistance to compression is plotted along the right-hand ordinate and the percent of resin in the composition is given along the abscissa. Curves $a$ and $b$ demonstrate the results obtained with varying proportions of the resin and in a binder according to the present invention while graphs $c$ and $d$ represent the results obtained when the binder consists of the pure resin. In other words, for example, at 5% total resin concentration, the resistance to compression is increased by about 70% while the resistance to flexion is increased by about 30% over the corresponding values using the pure resin.
In FIG. 10, the ordinate and the abscissa represent the same quantities as discussed with respect to FIG. 9. Graphs $e$, $f$, $g$ and $h$ show the results of tests after 14 days with a material using a binder composition according to the invention in normal atmosphere and a moist atmosphere. The tests represented in heavy lines use the binder according to the present invention, while results represented in solid lines show the resistance to compression and flexion for a test atmosphere maintained at 20° C. and a relative humidity of 90%.
Graphs $i$, $j$, $k$ and $l$ show the results obtained wherein the binder consists of the pure resin. Comparing curves $e$ and $i$, for example at 5% resin and binder, it can be seen that there has been a 60% increase in resistance to compression in normal atmosphere. Comparing tests $f$ and $j$ it will be apparent that about 90% increase is obtained. Similar results are found in the flexion tests.

EXAMPLE 9

The procedure is as in the preceding examples, but the binder composition is:

| | Percent |
|---|---|
| Araldite GY-255 | 58 |
| Anatase titanium dioxide AT-1 | 14 } 42 |
| Rutile titanium dioxide RL-21 | 28 |

The curves in FIG. 3-9 illustrate the results obtained in the course of the same tests as defined above.

EXAMPLE 10

The procedure is as in the preceding examples, but the binder composition is:

| | Percent |
|---|---|
| Araldite GY-255 | 58 |
| Anatase titanium dioxide AT-1 | 21 } 42 |
| Rutile titanium dioxide RL-21 | 21 |

The curves in FIG. 3-10 illustrate the results of the tests conducted as defined above.

EXAMPLE 11

The procedure is as in the preceding examples, but the binder composition is as follows:

| | Percent |
|---|---|
| Anatase titanium dioxide AT-1 | 14 } 21 |
| Rutile titanium dioxide RL-21 | 7 |
| Araldite GY-255 | 79 |

The curves in FIG. 3-11 illustrate the results obtained by the same tests as previously.

B—Comparative examples

By way of comparison there are indicated below the characteristics of the material obtained by using the same resin without a pigmenting filler.

In the table,

Column $g$ indicates the percentage of total binder in the molded mixtures;

Column $h$, the mean bending strength;

Column $i$, the mean compressive strength.

TABLE A

| $g$ | $h$ | $i$ |
|---|---|---|
| 4.01 | 71.39 | 217.66 |
| 5.01 | 121.17 | 367.23 |
| 6.01 | 179.90 | 620.33 |
| 7.36 | 238.68 | 816.81 |

The critical character of the selection of the micronic filler and its proportion can be seen from the following tests:

Test 1

The procedure is the same as in the above examples, but the binder composition is as follows:

| | Percent |
|---|---|
| Araldite GY-255 | 73.418 |
| Zeolex 27 thixotropic filler | 26.582 |

This proportion corresponds to saturation. The results of the test carried out in the manner described above are shown in the curves in FIG. 4-1, which have the same significance as the curves in the preceding figures.

Test 2

Procedure is as in the previous examples, but with the following binder composition:

| | Percent |
|---|---|
| Araldite GY-255 | 67.69 |
| Medium mica W | 32.31 | which corresponds to saturation.

The results of tests carried out on test pieces so obtained are illustrated in the curves in FIG. 4-2.

C—Examples using a polyester resin

EXAMPLE 12

The procedure is as in the preceding examples, but the aggregate is a mixture of filler-laden standardized sand, the granulometry of which is in accordance with NF AFNOR P-15-403.

The resin is Rhodester 3016 BL.

The curing system is composed of:

| | Percent |
|---|---|
| Perlygel CR (benzoyl peroxide) | 2 |
| Dimethylaniline | 0.1 | by weight, referred to the resin.

The two substances are incorporated separately in the resin, one after the other.

The micronic filler is red ion oxide 180 F. in the ratio of 42% to 58% of resin.

The proportion of resin was 10% referred to the total of the overall formulation.

The proportion of red iron oxide is 7.42% referred to below:

| | |
|---|---|
| b | 2.339 |
| c | 257.81 |
| d | 997.30 |
| e | 3.868 |
| f | 0.488 |

EXAMPLE 13

The procedure is as in Example 12, but the binder composition is as follows: Rhodester 3016 BL; Rutile RL-21, and Anatase AT-1.

The two titanium dioxides were in the following proportions: 2 parts of Anatase AT-1, and 1 part of Rutile RL-21 and the entire micronic filler was present in the same proportion as in Example 12.

The results are shown in the following table:

| | |
|---|---|
| b | 2.339 |
| c | 293.62 |
| d | 1054.10 |
| e | 3.590 |
| f | 0.200 |

D—COMPARATIVE EXAMPLES

Test 3

By way of comparison there are indicated below the results of tests carried out on test pieces obtained from the same binder without micronic filler, that is to say Rhodester 3016 RL resin and the same curing agent.

| | |
|---|---|
| b | 2.1676 |
| c | 176.06 |
| d | 826.11 |
| e | 4.692 |
| f | 1.880 |

Test 4

Likewise by way of comparison there are indicated in the table below the results of tests carried out with test pieces obtained from a binder composition comprising the same binder but in which the filler was composed of mica W medium to the extent of 5.75% referred to the total of the formulation.

| | |
|---|---|
| b | 2.0757 |
| c | 97.31 |
| d | 478.98 |
| e | 4.922 |
| f | 8.936 |

The graph of FIG. 5 shows on the ordinate the viscosity in poises at 20° centigrade and on the abscissa the revolutions-per-minute of a Brookfield viscometer. Curve A represents a mixture of Araldite GY-225 (epoxy resin) mixed with Zeolex 27, a silico-aluminate of sodium having particles of random shape, the latter in a proportion of 26.58% by weight of the mixture. Curve B shows a binder composition comprising a mixture of 67.69% by weight of Araldite GY–255 and 32.31% by weight of medium W mica. Curve C corresponds to a mixture of 58% by weight of Araldite with 42% of ferrous oxide. None of these three curves, A–C, represents the improved composition. Curve D shows the viscosity of a composition as recited in Example 8. Specifically curve D represents a composition having two parts of anatase to one part of rutile, it being understood that this latter is a form of titanium dioxide existing in substantially spherical particles, so that the additive consisted of 33⅓% of generally spherical particles. It should be clear that this and only this composition of the four provides even viscosity.

The graph of FIG. 6 employs the same notation as the graph of FIG. 5. Curve A' represents the reaction of a binding composition with 58% by weight of Araldite GY–255 and 42% by weight of anatase-type titanium dioxide, thus the composition of curve A is free of spherical particles. In curve B' there is shown a composition of 58% by weight of Araldite GY–255 and 42% by weight of rutile-type titanium dioxide. Curve C' relates to a composition corresponding to the one as defined in Example 8. Once again the criticality of the 30% by weight of spherical particles is clearly illustrated, since curve C shows the flattest most desirable characteristics.

The graph of FIG. 7 utilizes the same notation as graph of FIGS. 5 and 6. Curve A" represents a mixture containing 58% by weight of Araldite GY–255 and 42% by weight of a micronic charge half composed of anatase-type titanium dioxide and half of rutile-type titanium dioxide. Curve B" corresponds to a composition as defined in Example 8. Curve C" shows the viscosity characteristics of a composition of 58% by weight of Araldite GY–255, 14% by weight of anatase-type of titanium dioxide, and 28% by weight of rutile-type of titanium dioxide.

I claim:

1. A hardenable binder of substantially velocity-independent viscosity adapted to be used with an aggregate in the formation of a curable composition which consists essentially of a hardenable synthetic resin, and a micronic inorganic filler distributed in said resin, said filler having a particle size below 2 microns and being present in said binder in a proportion of about 25 to 75% by weight thereof, said filler consisting of about 27.5 to 35% generally spheroidal particles coated with said resin and adapted to coat the aggregate with an extremely thin layer of resin of the binder.

2. The hardenable binder defined in claim 1 wherein said filler consist of titanium dioxide.

3. The hardenable binder defined in claim 2 wherein said filler consists essentially of a 2:1 mixture of anatase and rutile.

4. A hardenable composition consisting essentially of a relatively large-grain inorganic aggregate having a particle size between substantially 2 microns and 1 mm. and a hardenable binder forming a matrix for said aggregate, said binder consisting essentially of a hardenable synthetic resin constituting 2 to 13% by weight of the composition, and an inorganic micronic filler of a hardness greater than that of said aggregate uniformly distributed in said resin and coated thereby, said filler constituting 25 to 75% by weight of said binder and being composed of particles with a particle size below 2 microns and about 27.5 to 35% of which are of generally spheroidal configuration.

5. The composition defined in claim 4 wherein said binder consists of a mixture of the filler and the resin with substantially velocity-independent viscosity.

6. The composition defined in claim 4 wherein said synthetic resin is a polyester present in an amount ranging between 7 and 13% by weight of the composition, or is an epoxy present in an amount ranging between 2 and 7% by weight of the composition.

7. The composition defined in claim 6 wherein said aggregate consists primarily of sand, stone and gravel with a particle size above about 80 microns.

8. The composition defined in claim 7 wherein said aggregate further includes a siliceous extender having particle sizes ranging substantially from 80 microns to substantially 2 microns.

9. The composition defined in claim 8 wherein said filler consists of titanium dioxide.

10. The composition defined in claim 9 wherein said filler consists essentially of a 2 to 1 mixture of anatase and rutile.

11. A method of making a hardenable composition comprising the steps of intimately mixing a hardenable synthetic resin and a micronic inorganic filler with a particle size below 2 microns to form a binder composition containing 25 to 75% by weight of said filler, said filler consisting of about 27.5 to 35% generally spheroidal particles and being coated with said resin wherein said binder forms a mixture of substantially velocity-independent viscosity; combining said mixture with an aggregate consisting at least in part of sand, stone or gravel with a particle size above 80 microns to coat the aggregate with a thin layer of the velocity-independent viscosity mixture, said filler having a hardness greater than that of said aggregate, said binder being mixed with said aggregate in such proportion that said resin makes up to 2 to 13% by weight of the resulting composition, and setting said composition.

12. The method defined in claim 11 wherein said binder is combined with said aggregate at an elevated temperature.

13. The method defined in claim 12 wherein said aggregate is heated prior to combining said binder therewith.

14. The hardened composition consisting essentially of:
   ($A_1$) a component selected from the group which consists of sand, stone, gravel and mixtures thereof with a particle size above 80 microns,
   ($A_2$) a siliceous extender having a particle size between 2 microns and 80 microns; and
   (B) a hardened binder coating said aggregate and bonding same together, said binder consisting essentially of:
   ($B_1$) a hardened synthetic resin present in said composition in an amount of 2 to 13% by weight thereof, and
   ($B_2$) a micronic inorganic filler of a hardness greater than that of said aggregate distributed in and coated by said synthetic resin and constituting 25 to 75% by weight of said binder while imparting thereto a substantially velocity-independent viscosity, said filler having a particle size below 2 microns and consisting of 27.5 to 35% generally spheroidal particles.

15. The composition defined in claim 9 wherein said synthetic resin is selected from the group which consists of epoxy resins, urethane resins and polyamides and said filler is a 2:1 mixture of anatase and rutile.

References Cited
UNITED STATES PATENTS

| | | | |
|---|---|---|---|
| 2,751,775 | 6/1956 | Sergovic | 260—40 X |
| 2,956,034 | 10/1960 | Simpson | 260—37 EP UX |
| 3,328,231 | 6/1967 | Sergovic | 260—40 X |
| 3,078,249 | 2/1963 | Russell | 260—40 |

LEWIS T. JACOBS, Primary Examiner

U.S. Cl. X.R.

260—37 EP, 37 N, 37 SB, 38, 39 R, 41 R